Patented Aug. 8, 1950

2,517,581

UNITED STATES PATENT OFFICE 2,517,581

METHOD OF DIMENSIONALLY STABILIZING ORIENTED VINYLIDENE CHLORIDE POLYMER FILM

Robert D. Lowry and Hugo L. Schaefer, Midland, Mich., assignors to The Dow Chemical Company, Midland, Mich., a corporation of Delaware No Drawing. Application January 23, 1946, Serial No. 643,000

2 Claims. (Cl. 18—48)

This invention relates to a process for treating oriented films of crystalline vinylidene chloride-vinyl chloride copolymers, substantially to eliminated their tendency to shrink when heated. It relates in particular to such a method applied to a copolymeric film of from about 88 to about 93 per cent vinylidene chloride and complementarily from about 7 to 12 per cent of vinyl chloride.

In the past several years numerous patents and other publications have described the normally crystalline vinylidene chloride copolymers. It has thus become known that one of the principal such copolymers contains within a few per cent of 90 per cent vinylidene chloride, the balance being vinyl chloride; that such high-vinylidene chloride copolymers are crystalline, as shown by X-ray diffraction patterns; that they may be fused, supercooled, and cold-worked, as by stretching, to form oriented crystalline articles of high tensile strength; and, that oriented crystalline films of the vinylidene chloride-vinyl chloride copolymer have wide utility in the industrial arts.

It has been found that films of the herein-concerned copolymer are caused to shrink materially when warmed to temperatures above 60° C., even for short periods, and that they shrink more gradually when held for prolonged periods at temperatures as low as room temperature. Since there are many uses for strong films in which it may be necessary to encounter temperatures at which shrinkage might occur in the "as made" condition of these films, and since such shrinkage results in unsightly wrinkles, due to non-uniform stresses in different directions across the film, it has become necessary to seek a means for overcoming these and associated disadvantages.

It is accordingly among the objects of the present invention to provide a method whereby an oriented crystalline film of high vinylidene chloride-balance vinyl chloride copolymer may be made substantially resistant to dimensional changes at temperatures up to 100° C., or higher. A related object is to provide a method whereby such an oriented film may be treated to eliminate or minimize original inequalities in its internal stresses, and to yield a dimensionally stable, wrinkle-free oriented film. A particular object is to provide a method whereby a stretched and oriented film of a crystalline vinylidene chloride-vinyl chloride copolymer may be treated so that, when heated for 30 minutes at 100° C., it will exhibit a shrinkage of not more than about 3 per cent. Another object is to produce an oriented crystalline film of the said copolymer which is dimensionally stable at temperatures up to 100° C., which remains wrinkle-free when heated to such temperatures, and which retains the strength and other desirable properties of the original film. Related objects may become apparent as the description proceeds.

It has now been found that the foregoing and related objects may be attained by heating an oriented film of a crystalline vinylidene chloride-vinyl chloride copolymer to a temperature of from 25 to 40 centigrade degrees above that at which dimensional stability is desired, and at least 10 centigrade degrees below its softening point, while restraining the film against substantial shrinkage, for a period sufficient to cause the same film to shrink substantially at the same temperature if unrestrained, and cooling at least to the desired temperature of stability while still restrained. In a preferred and improved embodiment of the invention, such a film is heated to between 125° C. and 10 centigrade degrees below its softening point, for a time from 10 seconds to 150 seconds, while holding the film so as to prevent more than 70 per cent of the amount of shrinkage which the same film exhibits when heated under the same conditions of time and temperature but without restraint, and cooling the film while restrained against change of shape and dimension. Such treatment produces a wrinkle-free film which can subsequently be exposed to temperatures of 100° C. for 30 minutes in the unrestrained condition with no more than 3 per cent further shrinkage, usually considerably less than 2 per cent.

Since the particular conditions to which a film may be exposed in service will vary according to the practices of the various factors in the packaging industry, it is most convenient to establish the standard shrinkage, for comparison, on the original film under the conditions of the industry in which it is to be used, and with the available heating equipment. A carefully measured sample of the stock film is heated in an unrestrained, or slack, condition, suitably while suspended in air, to the temperature and for the length of time which will be employed in the stress-relieving process of the present invention. It is then cooled rapidly to room temperature, and measured again as accurately as possible, to determine both longitudinal and transverse shrinkage. The values obtained help to establish the conditions of restraint to be employed in the present process. The following table presents data purely by way of illustration, respecting the unrestrained shrinkage of average films composed of a 90 per cent vinylidene chloride-10 per cent vinyl chloride copolymer, plasticized with 7 per cent of its weight of di-(alpha-phenylethyl) ether. The films were 2 mils thick, and during their manufacture from an extruded and supercooled tube, had been stretched longitudinally about two- to three-fold while being expanded radially about four-fold. The composition of the so oriented, crystalline films had a softening point of about 170° C. At temperatures above 100° C., no noticeable difference in shrinkage was obtained when exposure times were varied from as little as 10 seconds to as much as a week, and at all temperatures above 50° C., shrinkage of unrestrained film was complete in about 2.5 minutes. The film had been stored, since its manufacture, on a tightly wound reel which prevented longitudinal shrinkage but which may have permitted some slight transverse shrinkage, and for this reason the heat treatment resulted in a greater apparent longitudinal change than the one in the transverse direction.

| Temperature, °C. | Time, Seconds | Average Shrinkage, Longitudinal | Per Cent Transverse |
|---|---|---|---|
| 40 | 150 | 0.1 | 0.1 |
| 60 | 150 | 3.5 | 2.5 |
| 80 | 150 | 8.8 | 6.4 |
| 100 | 150 | 16 | 12 |
| 120 | 10 | 25 | 21 |
| 130 | 10 | 31 | 27 |
| 140 | 10 | 40 | 35 |
| 150 | 10 | 50 | 46 |
| 160 | 10 | 60 approx. | 60 approx. |

In the tests reported in the preceding table it was found that the heated films no longer had the desirable attributes of oriented crystallinity. The films were still crystalline, but the arrangement was essentially random. It is presumed that the treatment of the unrestrained film caused such complete relaxation of the internal stresses as to permit some of the submicroscopic crystallites to become upended, i. e. to become vertical to the plane of the film, and thus to weaken it.

Since it is desired to retain the characteristic high strength of films in which the crystallites are known or presumed to lie substantially in layers parallel to the surfaces of the films, and to that extent to be oriented, attempts were made to overcome the disadvantages found to accrue to unrestrained shrinkage. One such treatment consisted of heating the film to shrinkage temperatures at which stability was desired, while the film was restrained against any change in dimension, as by clamping it in a fixed and taut position. The treatment was successful in that it provided a "flat" or wrinkle-free sheet, but the required treating time was too long to be fully satisfactory at lower temperatures, and the treated films had residual shrinkage values of about 5 per cent.

There was finally found a set of conditions of treatment, constituting the preferred method of the present invention, whereby the disadvantages inherent both in heating unrestrained film and in heating fully restrained film can be and are avoided. The newly discovered method requires that the film to be treated be held securely at two or more of its opposite margins, but with an initial amount of slack which will be taken up by from 10 to 70, and preferably from 30 to 50 per cent of the shrinkage which that film will undergo if unrestrained when heated to the proposed treating temperature for the intended time of treatment. The so secured film is then heated to a fixed temperature at least 25 degrees above the temperature at which stability is desired, and at least 10 centigrade degrees below the softening point, for from 10 to 150 seconds. This treatment removes the initial slack without destroying the preferred planar orientation, and restores tension to the film. The film is cooled at least to the desired temperature of stability while still under its final restraint, and unrestrained samples thereof which are heated to the desired temperature of stability for 30 minutes are found to exhibit a residual shrinkage, in the direction of the restraint during treatment, of the general order of 3 per cent or less, and to be substantially wrinkle-free, even when exposed to that temperature for extended periods. If more than 70 per cent of the maximum shrinkage is permitted, the orientation is apparently too far gone to be recovered by final tension, and the results resemble those obtained by heating wholly unrestrained film. On the other hand, if less slack than will be taken up by 10 per cent of the maximum shrinkage is left in the film before treatment the results resemble those obtained with fully restrained films, either rupturing the film or leaving it insufficiently stabilized for the more exacting uses. When the treating temperature is less than about 125° C., in the case of the previously identified vinylidene chloride-vinyl chloride copolymer films, the test for residual shrinkage at 100° C. and for 30 minutes develops values considered too high for most practical applications where elevated temperatures may be encountered, but if the desired temperature of stability is below 100° C., treating temperatures correspondingly below 125° C. are satisfactory. Temperatures within 10 degrees below the softening point are unsatisfactory because of the incipient destruction of crystallinity at these temperatures with resulting loss of most of the desirable properties of the film.

In practice, the invention may be applied to cut film mounted in tentering frames of such design as to permit the desired partial shrinkage and to prevent further shrinkage during the heat-treatment and subsequent cooling, or it may be applied to continuous strips of rolled film, by conveying the film with the required slack between pairs of pinch rolls and then in a taut condition from the second such pair of pinch rolls to a third pair, all in the heating zone, and finally conveying the still taut and wrinkle-free film around a fourth set of pinch rolls and thence to windup in a cool zone. If desired, the pairs of rollers may each consist of one concave roller and a complementary convex roller, or the rollers of each pair may each be slightly crowned, i. e. convex, to allow transverse shrinkage in the advancing sheet. A moving chain of tentering clamps may also be employed to provide the lateral restraint, if desired. These and many other devices suitable for the purpose will be apparent to those skilled in the art of handling thin foils and similar strip material, and the apparatus employed does not constitute a part of the present invention.

The following examples will serve to illustrate the practice of the invention:

*Example I*

The film stock employed was 2.25 mils thick, 44 inches wide, and was cut to 102 inch lengths. It was composed of a copolymer having an analysis of about 88 per cent vinylidene chloride and 12 per cent vinyl chloride, and was plasticized with 7 per cent of its weight of an extrusion assistant or plasticizer, di-(alpha-phenylethyl) ether. The film had a softening point of about 168° C. A sample of the film heated for 20 seconds to 140° C. while freely suspended in air was found to shrink 36 per cent along its longitudinal axis and 33 per cent transversely. The cut sheets were fastened to a rectangular frame so as to allow 50 per cent of the normal shrinkage to occur. The end bars were spaced 82 inches apart, and the side bars were 35 inches apart, a one inch margin around the film being required for clamping purposes. The sheet thus had about 18 per cent longitudinal slack and about 16.5 per cent transverse slack. The film was then heated in an oven for 20 seconds at 140° C., and was then removed and cooled while still in the frame. After cooling, the film was removed from the frame, and the surrounding 1-inch margins were cut away, leaving a wrinkle-free film 35 inches wide and 82 inches long, samples of which had less than 2 per cent residual shrinkage when hung in an air chamber at 100° C. for 30 minutes. The final thickness of the treated film was just less than 3 mils, and the tensile strength had shifted from original values, before treatment, of 5200 pounds per square inch along the longitudinal axis, and 9800 pounds per square inch at right angles thereto, to final values of 7100 and 7900 pounds per square inch, respectively.

*Example II*

In a manner similar to that described above, a similarly plasticized film composed of a copolymer of 93 per cent vinylidene chloride and 7 per cent vinyl chloride, which had been stretched about equally in both directions during its manufacture, and which had a softening point of 173° C., was to be heat treated at 150° C. for 10 seconds. Under those conditions, the unrestrained film shrank an average of 48 per cent. The tentering frame was set up to allow one-third of this normal shrinkage, with its side bars 35 inches apart and its end bars 84 inches apart. After the heat treatment for 10 seconds at 150° C., and cooling under tension to room temperature, the film sheet was trimmed as before to remove the margins, and was found to be wrinkle-free, and to have about 1.8 per cent residual shrinkage when tested at 100° C. for 30 minutes.

The herein described treatment has been found to overcome one of the principal difficulties which had been encountered in handling film made from crystalline copolymers of vinylidene and vinyl chlorides, namely, the problem of "crazy-quilt" wrinkle formation and irregular shrinkage when subjected to elevated temperatures. While such shrinkage may be advantageous in some types of skin-tight packaging, it is a distinct disadvantage in most packaging operations.

The invention has been illustrated with respect to two films of specific vinylidene chloride-vinyl chloride copolymer composition, but has been defined with respect to, and is applicable to any thin film composed essentially of a crystalline copolymer of vinylidene and vinyl chlorides and showing, by X-ray diffraction patterns, preferred planar orientation of the crystals. Such films, presenting the problem here solved, are commercially available in thicknesses from 1.25 to about 2.5 mils, but may be produced, and will exhibit the same wrinkling tendencies, and the same response to the present treatment, in thicknesses from 0.3 to 10 mils or more. The presence or absence of plasticizer in the films to be treated is relatively insignificant to the process, except as it may affect the amount of shrinkage in the unrestrained film and will, to that extent, affect the settings on the tenter frame.

The application of the described method to the substantial elimination of residual shrinkage in crystalline polymeric filaments of the disclosed composition should be apparent from the foregoing description.

We claim:

1. The method which comprises heating a film of a crystalline copolymer of vinylidene chloride and vinyl chloride, having preferred orientation of the crystallites in layers parallel to the surfaces of the film, to a temperature between 125° C. and 10 centigrade degrees below the softening point for a period between 10 seconds and 150 seconds while so securing the film as to permit at least 10 per cent and to prevent more than 70 per cent of the shrinkage which the same film exhibits when heated for the same time and at the same temperature but without restraint, and cooling the film at least to 100° C. under sufficient tension to prevent further change in dimension, and releasing the wrinkle-free product, which still exhibits planar orientation and representative samples of which are characterized by having a residual shrinkage of less than about 3 per cent when reheated in an unrestrained condition to 100° C. for 30 minutes.

2. The method which comprises heating a film of a crystalline copolymer of vinylidene chloride and vinyl chloride, having preferred orientation of the crystallites in layers parallel to the surfaces of the film, to a temperature between 125° C. and 10 centigrade degrees below the softening point for a period between 10 seconds and 150 seconds while so securing the film as to permit at least 30 per cent and to prevent more than 50 per cent of the shrinkage which the same film exhibits when heated for the same time and at the same temperature but without restraint, and cooling the film at least to 100° C. under sufficient tension to prevent further change in dimension, and releasing the wrinkle-free product, which still exhibits planar orientation and representative samples of which are characterized by having a residual shrinkage of less than about 3 per cent when reheated in an unrestrained condition to 100° C. for 30 minutes.

ROBERT D. LOWRY.
HUGO L. SCHAEFER.

REFERENCES CITED

The following references are of record in the file of this patent:

UNITED STATES PATENTS

| Number | Name | Date |
| --- | --- | --- |
| 2,161,766 | Rugeley et al. | June 6, 1939 |
| 2,301,222 | Minich | Nov. 10, 1942 |
| 2,325,060 | Ingersoll | July 27, 1943 |
| 2,344,511 | Harder | Mar. 21, 1944 |